United States Patent [19]

Cottingham

[11] 4,131,964
[45] Jan. 2, 1979

[54] BAR STOCK GUIDES TUBES FOR METAL WORKING MACHINES AND SOUND-DAMPING LINERS FOR SUCH TUBES

[75] Inventor: Robert A. Cottingham, York, Pa.
[73] Assignee: The Polymer Corporation, Reading, Pa.
[21] Appl. No.: 767,985
[22] Filed: Feb. 11, 1977

Related U.S. Application Data

[63] Continuation of Ser. No. 603,079, Aug. 12, 1975, abandoned, which is a continuation of Ser. No. 398,341, Sep. 28, 1973, abandoned.

[51] Int. Cl.² ...................... B23B 25/00; B23G 11/00
[52] U.S. Cl. .................................. 10/162 R; 82/38 A; 193/38
[58] Field of Search .................. 10/162 R; 82/DIG. 9, 82/38 A; 138/125, 128, 137, 140, 149, DIG. 3, DIG. 7; 181/252, 256, 282, 294; 193/25 E, 38

[56] References Cited

U.S. PATENT DOCUMENTS

| | | |
|---|---|---|
| 1,891,290 | 12/1932 | Tessky .................................. 193/38 |
| 2,534,811 | 12/1950 | Corlett ............................ 82/DIG. 9 |
| 3,752,259 | 8/1973 | Wright et al. ......................... 193/38 |

FOREIGN PATENT DOCUMENTS 1306157  2/1973  United Kingdom.

OTHER PUBLICATIONS

"New Design of Noiseless Bar Guide," R. Perelmuter, published in GB Machines & Tooling, No. 7, 1965, p. 47.
"Hercules Abrasion Resistant 1900 UHMW Polymer," a guide published Hercules, Inc. 1970.
Modern Plastics Encyclopedia, vol. 49, No. 10A, Oct., 1972, p. 86.

Primary Examiner—E. M. Combs
Attorney, Agent, or Firm—Richard O. Church

[57] ABSTRACT

Sound-damping liners for bar stock guide tubes and the like for use in automatic metal working machines, said liners being produced from ultra high molecular weight polyethylene; means insulating the outer periphery of the liner from the inner surface of the guide tube; and means for retaining the liner within the guide tube.

4 Claims, 12 Drawing Figures

FIG. 8
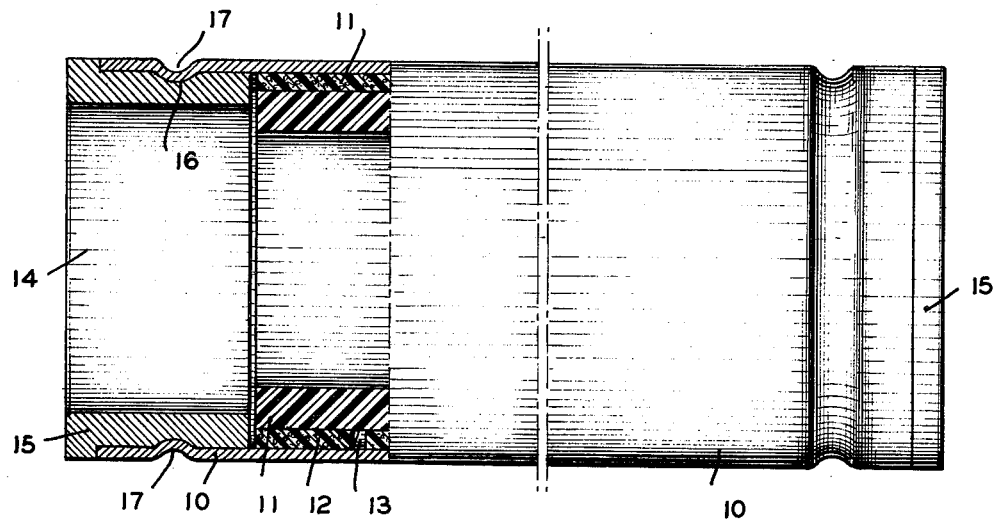
FIG. 9
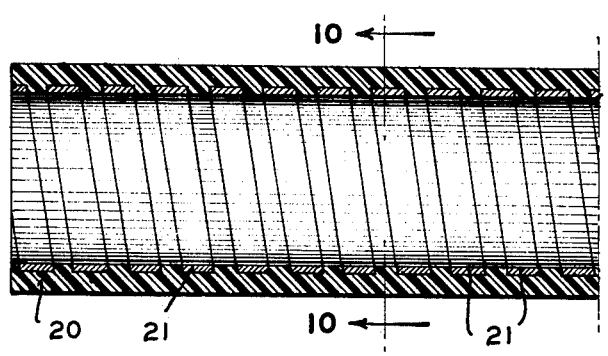
FIG. 10
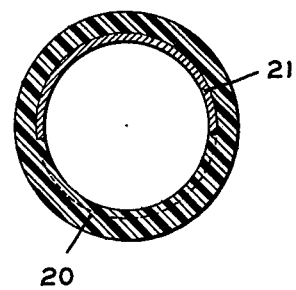
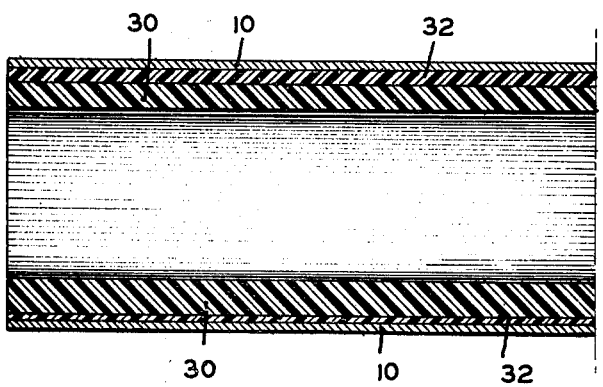
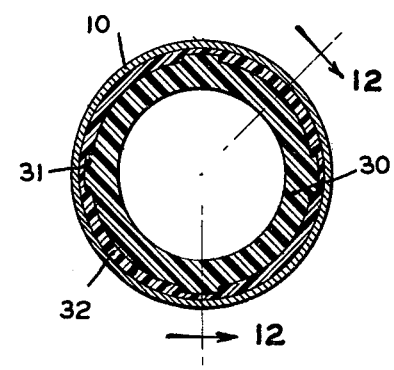
FIG. 12
FIG. 11

4,131,964

BAR STOCK GUIDES TUBES FOR METAL WORKING MACHINES AND SOUND-DAMPING LINERS FOR SUCH TUBES

This is a continuation of application Ser. No. 603,079 filed Aug. 12, 1975, now abandoned. Application Ser. No. 603,079 is a continuation of application Ser. No. 398,341 filed Sept. 28, 1973, now abandoned.

This invention relates to metal working machinery and more particularly to that class of such machinery where lengths of metal in the form of bar stock are fed to the apparatus and such operations as threading, drilling, reaming, slotting, and the like, are performed on work pieces which then may be severed from the inner extremity of the bar stock when the operation is completed. In the present application, an automatic screw making machine is utilized as the class of machinery to which reference is had.

Such machines may be of the single or multiple spindle variety and the inner extremity of each length of bar stock is received and retained within a collet chuck and the bar stock is rotated at high speeds while the work piece is being produced. The speed of rotation will have direct relationship to the material being worked upon. Where the bar stock is steel, a rotation at a rate of 800 rpm is appropriate; with brass bar stock, a speed of 2100 to 2400 rpm is required.

The lengths of bar stock which, it will be understood, initially extend a substantial distance beyond the machine per se are supported within elongate metallic stock guide or carrier tubes (in conventional machines such tubes have an average length of 10') which have an interior diameter sufficiently great to accommodate bar stock of varying diameters and profiles such as round, square, hexagonal, etc. Thus, there is no necessity for changing the stock guide tubes in accordance with bar stock diameter, nor would it be practical to make any such change. Since the bar stock is supported only at its inner extremity, and rotated at high speed, the unsupported portion thereof whips around by reason of the rotative forces, striking and rubbing against the interior wall surface of the guide tube and the noise thus created reaches such levels as to create grave problems. These include nervous fatigue suffered by the machine operator(s) with resulting decrease of efficiency. The gravity of the situation has long been recognized in this industry and there are Federal Regulations (Environmental Protection Agency) which include guide lines as to the daily permissible noise exposure of employees operating such machines, the number of hours having direct relationship to the sound level (decibels).

There have been continuing efforts for a long number of years to create optimum conditions where the sound level would be so reduced as to be so negligible that there would be no interference with normal activities including conversation. Such efforts heretofore have been unsuccessful.

It is a major object of the present invention to provide a novel bar stock guide tube for machines of the character with which we here are concerned which will reduce to a minimum the noise level occasioned by reason of rotative and vibratory influences as well as the actual contact of the unsupported portion of the bar stock against the interior surface of the stock guide tube.

It is a further object of the invention to provide a novel bar stock guide tube having an interior surface characterized by sound absorption capabilities.

It is a further object of the invention to provide a novel bar stock guide tube with an interior surface having impact and wear resistant characteristics vastly superior to those to be found in metallic tubes and which can in no manner mar or influence adversely the surface areas of the bar stock which come into contact therewith during passage therethrough.

It is a still further object of the present invention to provide a novel interior surface for stock guide tubes of the character with which we here are concerned which will be characterized by maximum sound absorbing qualities, which will have maximum impact and wear resistance, and which can be installed with equal facility in connection with either new machines or stock guide tubes presently in use.

Further objects and advantages of the invention will be readily apparent from the following description, taken in conjunction with the accompanying drawings, wherein:

FIG. 8 is an end elevational view similar to FIG. 7, partly in section and on an enlarged scale, of the finished stock guide tube, locking interengagement having been accomplished;

FIG. 9 is a longitudinal sectional view through a modified form of stock guide tube liner;

FIG. 10 is a vertical sectional view of the modified form of the invention, taken on the line 10—10 of FIG. 9;

FIG. 11 is a vertical sectional view of a further modified form of stock guide tube liner; and FIG. 12 is a longitudinal sectional view of said further modified form of the invention taken on the line 12—12 of FIG. 11.

Figure 1:
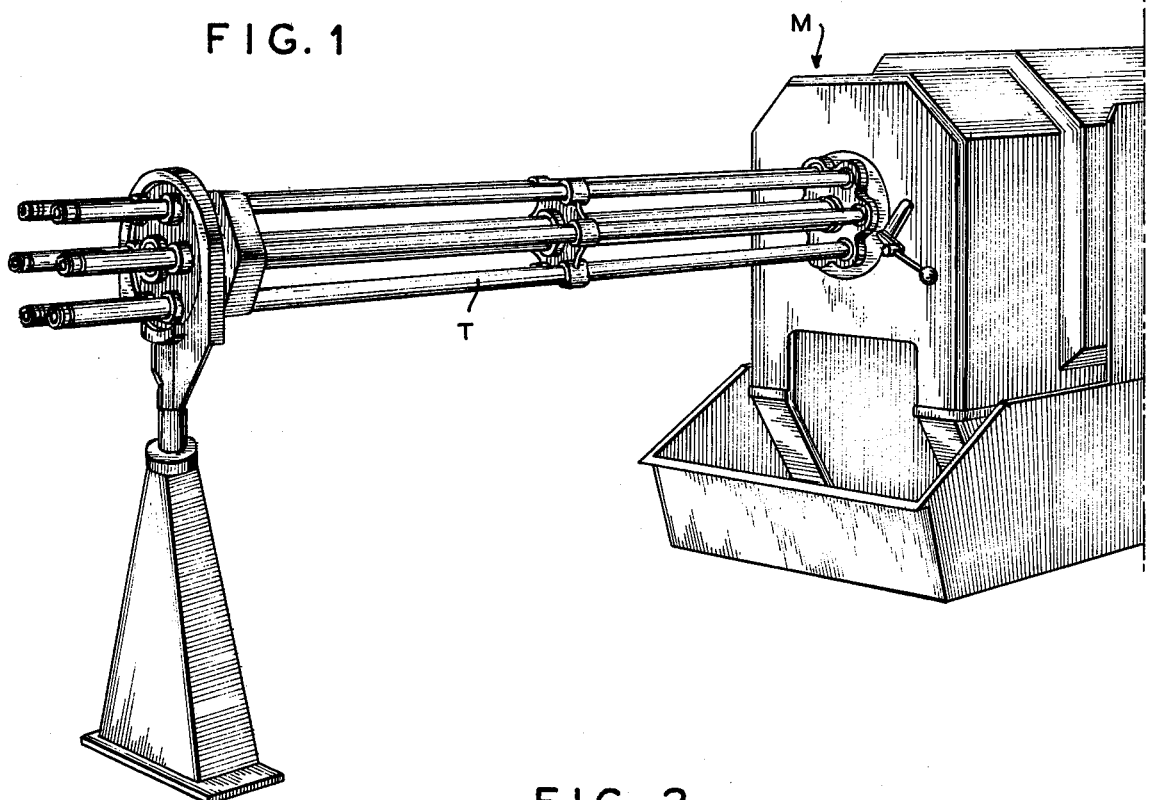
FIG. 1 is a fragmentary perspective view of a conventional multi-spindle automatic screw making machine illustrating rod stock guide tubes produced in accordance with the present invention.

There has been illustrated somewhat diagrammatically in FIG. 1 of the drawings the forward extremity of a conventional multi-turret automatic screw making machine M provided with a plurality of stock guide tubes T each such guide tube being intended for the reception and guidance of a length of bar stock to be worked upon, the inner extremity of each length of bar stock being received within a collet chuck (not shown), all as is well known in the art.

Figure 2:
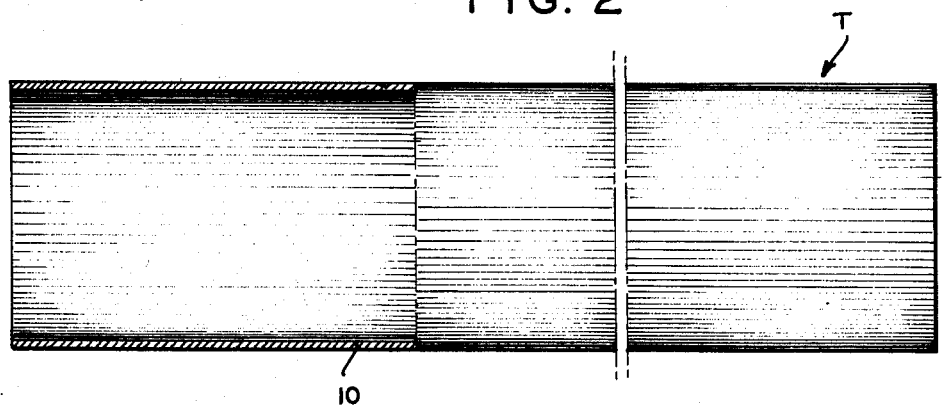
FIG. 2 is a side elevational view, partly in section, of a conventional stock guide tube.
Figure 5:
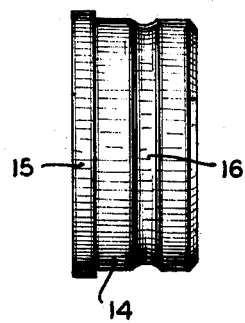
FIG. 5 is a side elevational view of a locking ring for retaining the tube liner within the stock guide tube.
Figure 6:
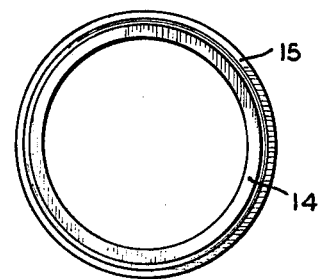
FIG. 6 is an end elevational view of the locking ring of FIG. 5.
Figure 3:
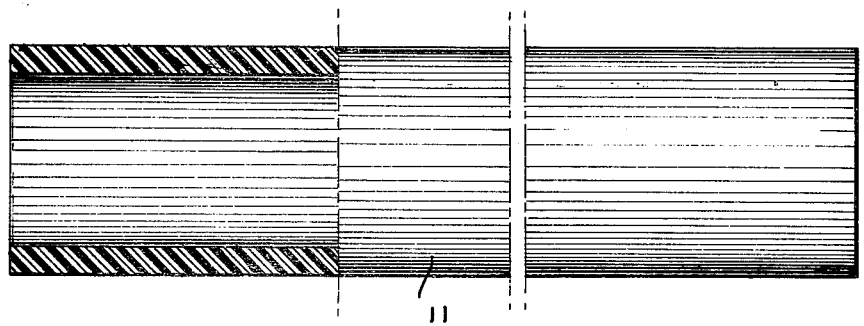
FIG. 3 is a side elevational view partly in section, of a stock guide tube liner constructed in accordance with the present invention.

Each cylindrical stock guide tube, indicated generally at 10 and particular reference being had to FIG. 2 of the drawings, is a relatively thin-walled tube preferably produced from stainless steel or comparable material and has a length usually approximating 10 feet and an interior diameter greater than that of the bar stock to be worked upon and having direct relationship thereto whereby there may be free rotation of the bar stock as it progresses through the stock guide tube in successive machining operations whereby individual end products (screws) are produced.

During the continuing machining operations the bar stock, which is supported only at its forward extremity, is rotated at high speeds resulting in the impartation of a whipping action at the trailing or free extremity with continuous impact against the inner surface of the stock guide tube producing tremendous noise vibrations. Where the bar stock material is steel, rotative speeds up to 800 rpm may be utilized; where the bar stock material is brass, rotative speeds on the order of 2100 to 2400 rpm may be employed.

To prevent the bar stock from striking the inner surface of the stock guide tube and thus avoid the transmission of noise vibrations to the bar stock guide tube and to the machine itself, the stock guide tube is provided with a sound deadening or damping axially disposed liner 11 produced from suitable plastic material having sound-deadening or absorptive characteristics. Such liners are known in this art and heretofore have been produced from such materials as polyvinyl chloride (PVC) which is known to have sound-damping characteristics. However, such materials have a relatively short life and under operative conditions with rotative speeds on the order of 800 to 1000 rpm the life of the tube is such that weekly replacement is required. Thus, while the PVC tubes provide some degree of noise reduction, the cost of continuing replacement together with the machine time lost in connection therewith have made the utilization of this proposed solution to the noise problem impractical.

Applicant has found that a tube liner produced from ultra high molecular weight polyethlene (UHMW) provides a complete solution to the problem of wear and also provides a liner having sound-damping characteristics heretofore unknown in this and related arts.

Desirably such tube liners, which are extruded in continuous lengths, are produced from a mixture of substantially equal parts of UHMW resins which may have molecular weights ranging from 1 million to 6 million. A mixture of UHMW resins having respective molecular weights of 2.5 million and 4 million, provides an excellent end product for present purposes. With a mixture of resin particles, each part of which approaches a molecular weight of 3.5 million and an intrinsic viscosity of 20, optimum results are obtained.

Significant mechanical properties of UHMW polymers (polyethylene) are as follows:

| | |
|---|---|
| Hardness | Rockwell R Scale (D 785 Test Method) - Typical Value 64 |
| Abrasion Resistance | With tests conducted over a period of 7 hours at a speed of 1750 rpm - with carbon steel assigned an abrasion rating of 100 (based on the volume of material lost during the test) UHMW had a rating of 15 |
| Impact Strength | The Izod impact strength of UHMW at room temperature is greater than 32 foot-pounds per inch on a modified double-notched specimen. In a ballistic test conducted at −65° F. a one-inch slab of UHMW stopped a .45 caliber bullet fired at a distance of 25 feet. |

Figure 4:
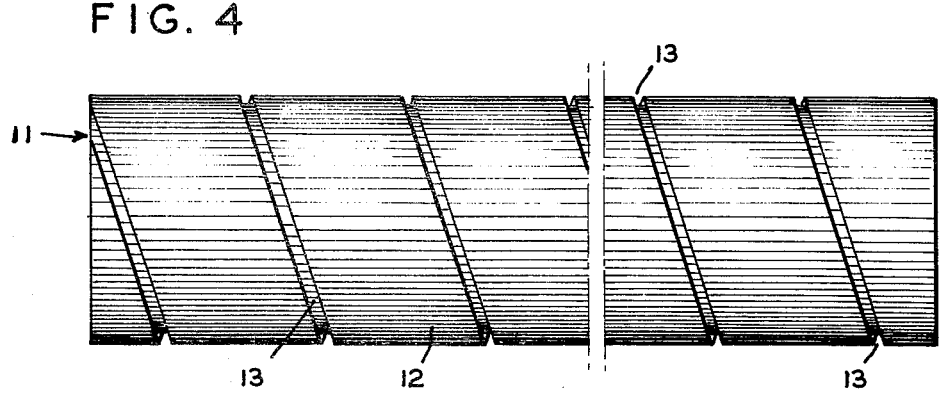
FIG. 4 is a side elevational view of the stock guide tube liner of FIG. 3 surrounded by a helically wound ribbon-type wrapping, produced from compressible material.

Desirably, particular reference being had to FIG. 4 of the drawings, the guide tube liner 11 is provided with an exterior wrapping in the form of a spirally wound ribbon 12 which extends from end to end thereof. This ribbon may be produced from any suitable foamed thermoplastic material, polyurethane having been found to be particularly desirable for present purposes. Such materials are readily compressible to 50% or less of the relaxed thickness thereof and a ribbon width on the order of 1 inch and a ribbon relaxed thickness (or gauge) on the order of ¼ inch are particularly suitable. As shown in the drawings, a relatively narrow space 13 is provided between adjacent convolutions of the ribbon for a purpose to be described more fully hereafter. Any compatible adhesive may be employed for providing accurate attachment of the spirally wound ribbon 12 with the exterior surface of the liner 11.

As stated hereabove, the interior diameter of the stock guide tube is not critical and has relationship to the diameter of the stock being worked upon. It is only essential that there be adequate clearance for the stock bar both in a position at rest and during operative conditions when vibratory or whipping action occurs within the guide tube. Such relationship also exists with respect to the interior diameter of the guide tube liner 11.

Figure 7:
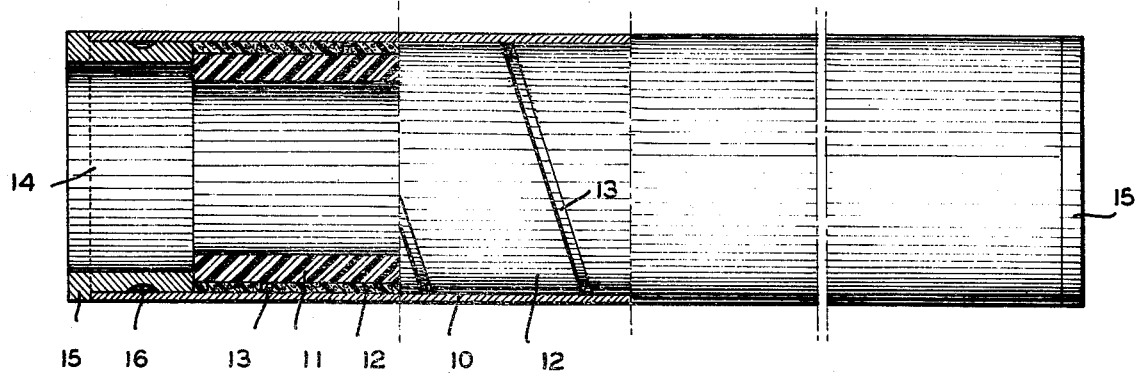
FIG. 7 is an end elevational view of the tube liner and locking caps positioned within the stock guide tube, the final locking step not having been accomplished.

The exterior diameter of the stock guide liner however is critical and, where a spiral wrapping 12 is employed, the difference between the interior diameter of the guide tube and the exterior diameter of the liner should be substantially identical to the relaxed thickness (or gauge) of the spiral wrapping. Thus, when the liner 11 is moved laterally into the guide tube 10 centrally of the length thereof as shown in FIGS. 7 and 8, the spiral wrapping (ribbon) will be compressed to 50% of its relaxed thickness and a snug fit will be provided as between the liner and the interior surface of the surrounding guide tube. With this assembled relationship all noise vibrations occasioned by the stock bar striking the interior of the liner are not transmitted directly to the guide tube but are damped and dissipated to a large degree in the spiral wrapping by reason of the cellular nature of the material from which this ribbon is produced. Additionally, the spiral dead air space within the guide tube, provided by the space 13 between adjacent convolutions of the spiral wrapping 12, serves to reduce further any transmission of noise vibrations from the liner to the guide tube.

It will be understood that the liner 11 is of lesser length than the guide tube and is positioned centrally thereof so as to be equidistant from the extremities of the guide tube and, to permanently lock the liner in place and insure against any inadvertent longitudinal movement thereof, locking rings 14 are provided. Each locking ring 14 is in the form of an annulus having an enlarged shoulder 15 which abuts the extremity of the guide tube when the locking ring, which has an exterior diameter complementary to the interior diameter of the guide tube, is positioned therein. This permits snug frictional engagement between the guide tube 10 and the opposed locking rings 14 with the inner extremity of each locking ring being spaced from the opposed extremity of the liner 11 a sufficient distance to provide clearance with respect to the adjacent extremity of the liner to compensate for expansion or the like by reason of changing temperature conditions of the two dissimilar materials.

If desired, each locking ring 14 may be provided with an annular groove 16 and after the assembly of guide tube, wrapped liner, and opposed locking rings has been effected the guide tube 10, adjacent each extremity thereof, is rolled or otherwise forced inwardly into the annular grooves 16 of the locking rings as indicated at 17 in FIG. 8 of the drawings. This makes for a permanently locked relationship between guide tube and liner. It will be understood that frictional engagement as between the rings 14 and the guide tube will be adequate for maintenance of assembled relationship or, if desired, threaded or other engagement between the rings and the guide tube may be utilized.

In the modified form of guide tube liner illustrated in FIGS. 9 and 10 of the drawings, the guide tube liner 20 is provided interiorly thereof with a flat spiral metallic ribbon 21, the interior diameter of this ribbon being identical to that of the liner thus providing a completely smooth interior surface throughout the length of the liner. This metal ribbon can be included during the production of the liner, whether by extrusion or otherwise, and will serve to provide increased resistance as against impact.

In the further modified form of liner illustrated in FIGS. 11 and 12 of the drawings, the liner 30 is provided with a plurality of longitudinally extending ribs 31. The exterior diameter of the ribbed portion of the liner 30, as shown, is slightly less than the interior diameter of the guide tube 12 and with the liner positioned axially within the guide tube suitable polymeric material (polyurethane or the like) which will foam and expand in situ is forced under appropriate pressure into the annular space between the interior diameter of the guide tube and the exterior diameter of the ribbed liner. This expanded material will create the continuous annular layer or sheath 32, extending the full length of the liner, and dampen noise vibrations arising within the liner under operative conditions.

In an actual test of the UHMW liner of the present invention, particular reference being had to the preferred species illustrated in FIGS. 2 through 8 of the drawings, installation was accomplished on a four spindle machine utilizing a ⅞" steel hexagonal bar. The converted machine was put in production and operated commercially at a speed of 800 rmp. Periodic inspections were made over an interval in excess of 3 months and no excessive wear of the interior surface of the tube liner occurred. Simultaneously, an identical machine with conventional stock bar guide tubes (without liners) was tested. A further test was made of a third machine which had been converted in accordance with the present invention but where no spiral sheath surrounding the liner was employed. In this machine, the UHMW liner made direct contact with the interior surface of the stock guide tube.

Acoustic profiles were taken around all three machines and it was discovered that in the converted machine without the spiral sheath the noise level at the guide tube was about 18½ decibels quieter than the standard model. The calculated results obtained disclosed that the guide tube noise is lower than the machine noise at most frequencies below 4000 Hz. The noise level of the converted machine where the spiral sheath was employed was 81½ dBA as compared with a level of 103½ dBA for the standard machine. Thus, the actual attenuation afforded by the converted machine was 22 dB. This highly significant reduction places the noise level well below the tolerable levels as set forth in Federal Regulations promulgated the the Occupational Safety and Health Administration (OSHA).

These prescribed limits are set forth in the following table:

| EMPLOYEE NOISE EXPOSURE LIMITS | |
|---|---|
| Sound Level in Decibels | Permissible Hours of Continuous Exposure |
| Under 90 dBA* | Unlimited |
| 90 - 92 dBA | 6 hours |
| 92 - 95 dB | 4 hours |
| 95 - 97 dB | 3 hours |
| 97 - 100 dB | 2 hours |
| 100 - 102 dB | 1.5 hours |
| 102 - 105 dB | 1 hour |
| 105 - 110 dB | 0.5 hours |
| 110 - 115 dB | 0.25 hours |
| Above 115 dB | None |

*A The sound level in decibels as measured by a sound level meter with an "A" weighted filter. Such a filter gives only partial emphasis to sounds at frequencies below 1000 Hertz (Hz). The reference pressure was 20 micronewtons per square meter.

The Sound Level Meter employed was a conventional calibrated microphone-amplifier-filter-meter which is employed to measure sound pressure level with characteristics established by ANSI Standard S1.4 (1971). When calculating sound pressure level in decibels, the reference or base pressure must be stated and the standard reference pressure is 20 micronewtons per square meter. This reference sound pressure is equivalent to the sound pressure of a 1000 Hz tone which would be just audible to a young adult with normal hearing ability.

As stated hereabove the testing of a standard machine disclosed a noise level of 103½ dBA. Reference to the OSHA permissible noise exposure table discloses that with this sound level permissible continuous employment (without rest) must be limited to 1 hour. With the machine converted to lined guide tubes produced in accordance with the present invention, the sound level dropped to 81½ dBA, this being a level at which continuous employment throughout the entire working day is permissible without the employee suffering undue fatigue or possible injury to hearing by reason of exposure to excessive noise levels.

There has thus been described a novel bar stock guide tube intended for use in connection with automatic metal working machines, and a novel liner for such tubes (and method of assembly) which may be produced with particular economy, will have long life, and will reduce the operative sound levels of such machines to a degree heretofore unknown in this and related fields.

It will be obvious to those skilled in this art that various changes may be made in the invention without departing from the spirit and scope thereof and therefore the invention is not considered limited by that which is shown in the drawings and described in the Specification and reference therefore is had to the Claims for summaries of the essentials of the invention and of the novel features of construction and combinations of parts for all of which protection is desired.

What is claimed is:

1. A bar stock feed tube assembly for metal working machines that provides a supporting structure through which lengths of bar stock may be fed, comprising: an elongated outer cylindrical metal tube, a slightly shorter inner cylindrical sound damping and wear liner coaxially disposed within the tube, and a pair of annular locking rings to secure the liner within the tube;

the liner comprising a tubular extrusion of ultra high molecular weight polyethylene and a ribbon of a foamed resiliently compressible thermoplastic material spirally wrapped around the surface of the liner, the interior diameter of the tube, the outer diameter of the liner, and the thickness of the ribbon being selected to hold the spiral wrapping in compression along substantially its entire axial extent when the liner is positioned within the tube;

the locking rings having an outer diameter essentially the same as the inside diameter of the tube, an inside diameter slightly greater than the inside diameter of the liner, an enlarged annular shoulder adjacent one end of the rings having an outside diameter essentially the same as the outside diameter of the tube and means to fixedly position each locking ring in opposite ends of the tube.

2. A bar stock guide tube assembly as set forth in claim 1 where adjacent convolutions of said spiral wrapping are spaced from each other to provide a spiral dead air space within said outer tube.

3. A bar stock feed tube assembly according to claim 1 wherein the means to fixedly position the locking rings is an annular groove in the surface of the rings into which a surrounding portion of the tube may be deformed.

4. A bar stock feed tube assembly according to claim 1 wherein the ribbon is compressed approximately 50 percent of its relaxed thickness when the liner is positioned within the tube.

* * * * *